Figure 1:
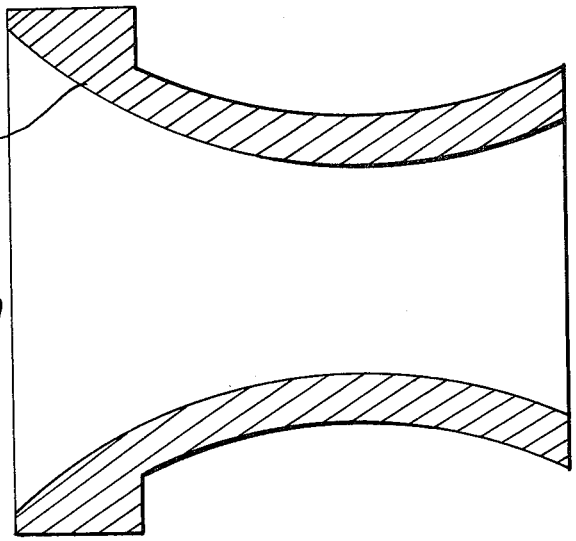

NOZZLE BEFORE USE

NOZZLE IN USE IN ROCKET MOTOR

INVENTOR.
PHILIP M. McKENNA.

NOZZLE BEFORE USE

NOZZLE IN USE IN ROCKET MOTOR

United States Patent Office 3,226,929
Patented Jan. 4, 1966

3,226,929
HIGH TEMPERATURE NOZZLE
Philip M. McKenna, Greensburg, Pa., assignor to Kennametal, Inc., Latrobe, Pa., a corporation of Pennsylvania
Filed July 31, 1962, Ser. No. 214,463
16 Claims. (Cl. 60—35.6)

This invention relates to nozzles, or orifices, for use at temperatures of the order of 5000° F. (2760° C.) and higher, and at extremely high velocity, such, for example, as are required for missile propulsion, rocket motors, and similar propulsion units operated with high energy fuels.

The combination of extreme temperature and the erosive or corrosive action of the products of combustion of such units, which in the case of some fuels may contain solid combustion products, such as aluminum oxide, impose extraordinarily severe requirements upon the nozzle materials. Thus, to be satisfactory the nozzle, or orifice, must not melt or crack in use, and it must resist erosion to avoid deleterious change in area or contour of the orifice throat. Despite the fact that these nozzles operate for only a few seconds, or at most during a very few minutes, no fully satisfactory nozzle has been available as far as I am aware prior to my invention.

It is among the objects of this invention to provide nozzles of the type referred to which may be produced readily and easily by standard procedures from commonly available materials, which satisfactorily meet the structural and operational requirements of such elements, and which uniquely possess the property of promptly attaining when put in service enhanced melting point and erosion resistance.

A further object is to provide an improved method of operating propulsion units of the types referred to above through the use of nozzles in accordance with the foregoing object.

A further object is to provide nozzles of the type referred to which comprise a high melting combination of a carbide of a high melting metal and an elemental high melting metal and which in use undergoes carbon transfer with conversion of said carbide to metal and concurrent production of carbide of said elemental metal with resultant increase in melting point of the nozzle composition.

Another object is to provide a method of making such nozzles that is simple, effective and easily practiced.

Other objects will be recognized from the following specification.

The nozzles provided by the invention are bonded compositions of an intimate mixture of a finely divided carburized tungsten and at least one finely divided metal of the group consisting of tantalum and niobium (columbium). In the preferred embodiment the compositions comprise, by weight, a major proportion of the carbide and a minor proportion of the metal. The carburized tungsten constituent may take a variety of forms such, for instance, as ditungsten carbide ($W_2C$), monotungsten carbide (WC), and carburized tungsten containing carbon in an amount different than is contained in the two carbides just mentioned, for instance tungsten with 1.4 percent of carbon as $W_2C$ dissolved in tungsten, and mixtures thereof. All such materials are contemplated by the term "carburized tungsten" as used hereinafter and in the claims.

These nozzles when subjected to the combustion flame or combustion products at the temperature normal to rocket and related propulsion units undergo at and adjacent the interior surface a carbon transfer reaction whereby the tantalum, or the niobium as the case may be, is converted to a carbide phase by the carbon of the carburized tungsten element which at the same time is converted to elemental tungsten in accordance with the reactions:

$$W_2C + Ta \rightarrow TaC + 2W$$
$$WC + Ta \rightarrow TaC + W$$

Similarly, if niobium is present in the original composition, either alone or in admixture with tantalum, it is converted to a carbide phase by a similar reaction. In addition to the above reactions other minor reactions may also take place forming minor amounts of phases which do not harm the useful properties.

Thus the result is that when a nozzle provided by the invention is subjected to the heat of the high energy fuel propulsion flame the composition is converted at and near the interior surface of the nozzle to a form of very substantially increased melting point and of greater hardness whereby fusion of the nozzle material is avoided and erosion and corrosion by the gases are minimized. For example, in the case of a nozzle composed of metallic tantalum and carburized tungsten containing 1.4 percent of carbon, the melting point of the carburized tungsten is about 4485° F. (2475° C.), while the melting point of tantalum is about 5425° F. (2996° C.). When subjected to the heat of the combustion blast the carburized tungsten transfers carbon to the tantalum which is converted to a tantalum carbide phase of a very high melting point. The melting point of TaC is reported to be about 7016° F. (3880° C.). At the same time, the loss of carbon to the tantalum converts the carburized tungsten to metallic tungsten, the melting point of which is about 6152° F. (3400° C.). In other words, the tantalum of the original composition is converted to a product of almost 900° C. (1652° F.) higher melting point, while the carburized tungsten constituent is at the same time converted to a product of about 925° C. (1697° F.) higher melting point. The net result, then, of placing a nozzle in accordance with the invention into service in a rocket motor or the like is prompt conversion from a melting point that is relatively low compared to the temperature of the products of combustion to a new form of increased melting point greater than that of the products of combustion.

Figure 2:
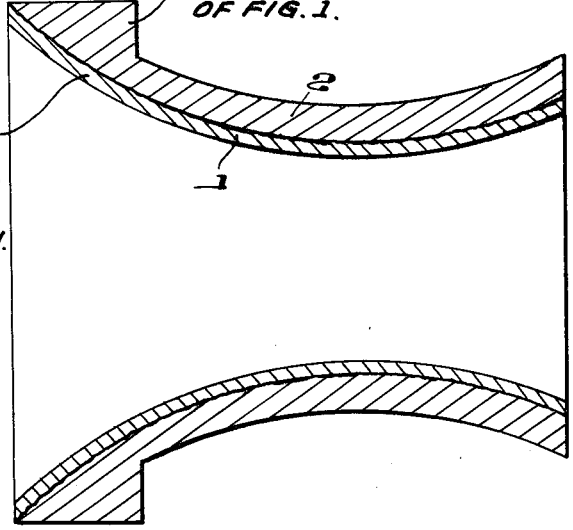
Figure 3:
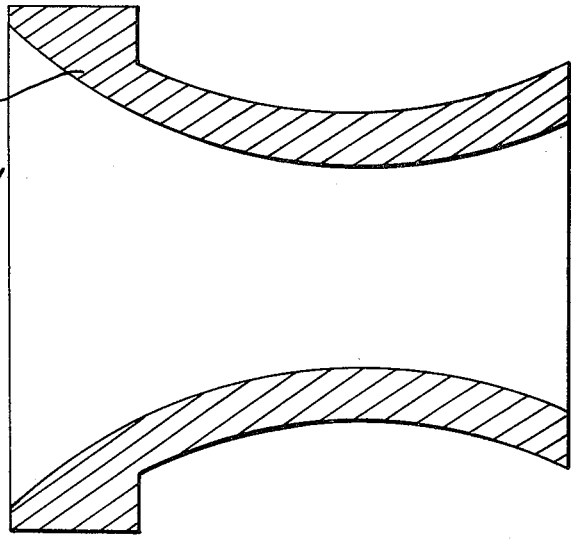
Figure 4:
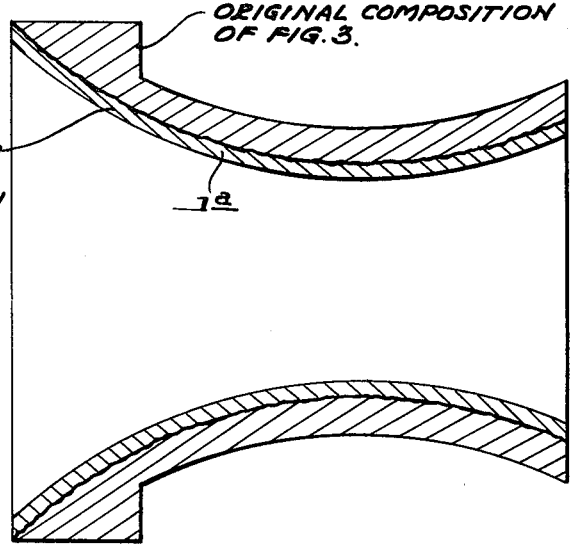

The invention will be described with reference to the accompanying drawings in which FIG. 1 is a longitudinal section through a typical nozzle used with, for example, rocket motors and made from a composition in accordance with one embodiment of the invention, showing it before use;

FIG. 2 is a view similar to FIG. 1 showing the nozzle of FIG. 1 after use in a rocket motor and illustrative of the change that occurs, in accordance with the invention, in such use; and FIGS. 3 and 4 are views similar to FIGS. 1 and 2 of another, and the preferred embodiment.

The nozzles according to the invention may be prepared suitably by pressing the finely powdered constituents about a solid carbide mandrel of appropriate size and contour, the pressing preferably being accomplished hot and hydraulically or explosively. Or, the mixed powders are pressed to form coherent blanks, or compacts. The shaped body may then be heated to form a body of sufficient mechanical strength to permit any necessary machining to bring the orifice to proper contour and dimensions.

If the sintering temperature is too high, the carbon transfer reaction may occur to a limited extent. Initiation of the reaction is avoided, or minimized, at temperatures of the order of 2500° F. and below but the compact thus produced is more fragile than is desirable. However, the compact may be bonded by infiltrating the fragile porous compact with silver at about 2000° F. with little or no conversion of Ta to TaC. This may be accomplished by distributing silver powder through the composition initially, or by placing silver on the compact, and heating above the melting point of silver in a vacuum or in an inert atmosphere, for instance hydrogen or helium. Or, the compact may be dipped into molten silver. The silver acts to bond the particles of carbide and metal to permit tool forming, grinding, etc., and, I believe, to inhibit to some extent the carbon exchange reaction at low temperatures. In use the high temperature of the blast will cause the silver to evaporate wholly or largely from the zone where the carbon transfer reaction occurs and will complete the carbon exchange reaction, and in so doing the silver will act to remove heat from the system and thus may simplify the heat sink problem.

Copper may be used in place of silver as the infiltrant.

In the preferred practice of the invention sufficient tantalum (or niobium) is present to take up all, or substantially all, of the carbon from the carburized tungsten constituent so that when the reaction occurs there will be little or no amount of the relatively low melting carburized tungsten left.

The degree of heat resistance of the nozzles in service may be varied according to the particular carburized tungsten constituent in the composition. Thus, as noted above tungsten containing 1.4 percent of carbon melts at about 4485° F. (2475° C.). Ditungsten carbide, ($W_2C$) on the other hand, melts at about 4982° F. (2750° C.), while monotungsten carbide (WC) melts at about 5198° F. (2870° C.). Thus it will be seen that depending upon the particular tungsten-carbon material used the properties may be varied. It has been pointed out above that tantalum melts at about 5425° F. (2996° C.), and the carbide at about 7016° F. (3880° C.). Other variation is possible through the use of niobium, which melts at about 4380° F. (2415° C.) while its carbide melts at about 7050° F. (3900° C.). Thus by appropriate carburized tungsten selection and proportioning to the Ta or Nb, various properties are to be had. In other words, the ranges of Ta or Nb and the carburized tungsten may be varied widely depending upon operating conditions such as the fuel type and hence the severity of operation. The range of particle sizes can be varied also. Further adjustment of the properties may be had also by including TaC initially with the tungsten carbide constituent and Ta or Nb metal.

In a nozzle or orifice body as described the carbon transfer occurs fully at and adjacent the nozzle surface contacted by the hot gasses. These changes occur to a progressively decreasing degree outwardly from the interior surface of the nozzle so that the main body largely retains the mechanical properties of the original composition. In addition to the development in the composition of a melting point capable of avoiding fusion, the same reaction conditions the interior surface to resist the destructive action of the gases due to the fact that TaC is harder than metallic Ta.

This action of the invention is illustrated by the drawings. FIG. 1 shows, in longitudinal section, a typical form of rocket motor nozzle made by pressing and sintering a mixture of finely divided carburized tungsten and tantalum metal. FIG. 2 is a view similar to FIG. 1 illustrating the same nozzle after use in a rocket motor. As a result of the flame blast the region 1, FIG. 2, at and adjacent the surface contacted by the blast has been converted to tantalum carbide and tungsten metal whereby the temperature inversion conditions described above have occurred. I.e., in the region 1 the carburized tungsten of melting point about 4485° F. has been converted to metallic tungsten of about 1652° higher melting point; at the same time the metallic tantalum of about 5425° F. melting point has been converted to tantalum carbide of about 7016° F. melting point. The remainder of the nozzle indicated by the numeral 2 remains in the original conditions shown in FIG. 1.

FIGS. 3 and 4 similarly represent the preferred embodiment in which the composition is compacted at a temperature too low to initiate the carbon transfer and then infiltrated with silver. As represented in FIG. 4, the silver is lost wholly, or at least largely, from the reaction zone 1a as a result of the blast.

Another feature of the invention is that the nozzle body is not fully consolidated as in cast or forged bodies but instead is in the preferred embodiment composed of particles of the two ingredients that are bonded together sufficiently to provide the strength necessary for any shaping operations, to permit handling, and to resist the pressure of the combustion blast. Such a body resists the formation and propagation of cracks due to the ductility of the metallic tantalum while permitting a reasonable amount of deformation or bending without rupturing, yet at and adjacent the interior surface the composition becomes in use a truly cemented metal body.

From what has been said it will be recognized that a unique feature of the invention is the development of increased hardness and increased heat resistance at and adjacent the inner, operating surface, exactly where those properties are needed. Furthermore, the good metallicity of the main body affords adequate heat conductivity, while the ductility of the main body is sufficient to withstand the stresses to which the nozzles are subjected and it remains effectively unimpaired because the carbon transfer reaction comes to its full extent only in the region contacted by the hot gases and becomes progressively and rapidly less from that region toward the outer surface. At any rate, since these nozzles are used but once any physical changes that may occur in cooling after use are of no significance.

Another unique property of my new nozzles is that in use there is little or no shrinkage such as is ordinarily experienced in cermets. That property makes it possible to machine or grind the bonded compacts to desired contours which remain dimensionally constant during preparation and during use.

As an example of the invention, tungsten monocarbide containing 6.12 percent of carbon was heated at 2350° F. with tungstic oxide ($WO_3$) in sufficient amount to reduce the carbon to 1.53 percent. The resultant powder was of 9.8 microns average size as measured by the Fisher Sub Sieve Sizer. A mixture of, by weight, 81.3 percent of this powder was then mixed with 18.7 percent of tantalum metal powder of 4.6 microns particle size that was produced by milling in a ball mill with carbide balls, which has a tendency to produce foliated particles that are mechanically desirable in this composition. This mixture and 1.5 percent of paraffin was ball milled as a slurry in petroleum naphtha for 60 hours. The resultant powder was of 7.8 microns average particle size. After evaporation of the naphtha the powder was pressed in a rubber envelope under a hydraulic pressure of about 23000 p.s.i. This rendered it sufficiently coherent to permit it to be formed by machining into the desired nozzle shape which was then sintered in vacuum at 4000° F. This nozzle was then tested by one of the leading companies engaged in missile and rocket development. There was used a solid fuel of aluminized polyethylene basis that was the standard fuel then used in the high temperature firing of certain production missiles. The duration of the test was 60 seconds at a calculated flame temperature of 5500° F. and a maximum pressure of 1030 p.s.i. There was no cracking, thermal or otherwise, of the nozzle while the throat diameter after firing was 0.0456 inch compared with an original diameter of 0.0458 inch. The throat showed a slight deposit of aluminum oxide, which representatives of the test company stated was desirable, and they reported that the test was highly successful. In fact, it was reported that of nozzles of eight materials tested this one was outstanding in performance and the only one to pass the test.

As another example, a composition of, by weight, 63 percent of powdered carburized tungsten and 37 percent of niobium was formed as described in the preceding example into a test nozzle and fired during 76 seconds using high energy propellant at an estimated flame temperature of 6540° F. During the first part of the firing period there was considerable pressure drop but thereafter it was normally regressive, which indicated no significant increase in erosion during the remainder of the firing time. This is believed to mean that as the reaction progresses the erosion is decreased by progressive formation of a W-TaC solid solution.

The same test was applied to a nozzle of what had theretofore been considered to be the best material for this purpose, namely, made from tungsten powder infiltrated with silver. It failed completely under the test conditions of the foregoing test.

In the practice of the invention it is possible to include in the composition some proportion of the higher melting carbide, i.e., that produced by carbon transfer. As an example, a nozzle was produced as described in the first example from a powdered mixture of, by weight, 24 percent of carburized tungsten, 26 percent of tantalum, and 50 percent of tantalum carbide, and test fired successfully at 6200° F.

Although the invention has been described with particular reference to nozzles composed entirely of the compositions described above, it will be understood that nozzles for these propulsion units may be supplied also by a suitable backing material of adequate mechanical properties, such as metal, graphite or ceramic, the operating surface being a facing of composition in accordance with the invention.

Although reference has been made to the conversion of Ta metal to TaC, it is recognized that there has been reported in the literature of di-tantalum carbide, $Ta_2C$. However, such a compound has not been evidenced by X-ray examination of compositions in accordance with this invention either as produced (sintered) or after exposure to elevated temperatures.

From what has been said it will be appreciated that these nozzles constitute an improvement in the operation of rocket motors and related propulsion units actuated with high energy fuels.

According to the provisions of the patent statutes, I have explained the principle of my invention and have described and illustrated what I now consider to represent its best embodiment. However, I desire to have it understood that, within the scope of the appended claims, the invention may be practiced otherwise than as specifically described and illustrated.

I claim:

1. A nozzle element for a rocket motor or the like propulsion unit exposed in use to extremely high temperatures and the erosive action of high velocity products of combustion of high energy fuel used, at least the internal surface of said nozzle being a bonded composition of an intimate mixture of (1) a finely divided carburized tungsten constituent, and (2) at least one finely divided metal of the group consisting of tantalum and niobium, said tungsten constituent and said metal interacting upon passage of said products of combustion at a temperature of the order of 5000° F. and higher with conversion of said metal to a phase of its carbide at and adjacent the internal surface of the nozzle with concurrent production of tungsten metal and substantial increase in melting point of the thus-converted composition.

2. A nozzle element for a rocket motor or the like propulsion unit exposed in use to extremely high temperatures and the erosive action of high velocity products of combustion of a high energy fuel, at least the internal surface of said nozzle being a bonded composition of an intimate mixture of by weight (1) a major proportion of a finely divided carburized tungsten constituent, and (2) a minor proportion of at least one finely divided metal of the group consisting of tantalum and niobium, said tungsten constituent and said metal interacting upon passage of said products of combustion at a temperature of the order of 5000° F. and higher with conversion of said metal to a phase of its carbide at and adjacent the internal surface of the nozzle with concurrent production of tungsten metal and substantial increase in melting point of the thus-converted composition.

3. A nozzle according to claim 2, said carburized tungsten constituent being at least one member of the group consisting of $W_2C$, WC, and mixtures of tungsten with a tungsten carbide.

4. A nozzle according to claim 3, said constituent being tungsten with about 1.4 percent of $W_2C$.

5. A nozzle element for a rocket motor or the like propulsion unit exposed in use to extremely high temperatures and the erosive action of high velocity products of combustion of a high energy fuel, at least the internal surface of said nozzle being a bonded composition of an intimate mixture of (1) a finely divided carburized tungsten constituent, and (2) at least one finely divided metal of the group consisting of tantalum and niobium, said metal being present in an amount substantially sufficient to convert all of the carbon of said constituent to a phase of the metal carbide, said tungsten constituent and said metal interacting upon passage of said products of combustion at a temperature of the order of 5000° F. and higher with conversion of said metal to a carbide phase at and adjacent the internal surface of the nozzle with concurrent production of tungsten metal and substantial increase in melting point of the thus-converted composition.

6. A nozzle for a rocket motor or the like propulsion unit in which a high energy fuel is burned with production of high velocity products of combustion at a temperature of the order of 5000° F., said nozzle being composed of a bonded composition of, by weight, an intimate mixture of (1) a major proportion of a finely divided carburized tungsten constituent, and (2) a minor proportion of at least one finely divided metal of the group consisting of tantalum and niobium, said metal being present in an amount sufficient to react with all of the carbon of said constituent to a phase of the metal carbide, said tungsten constituent and said metal interacting upon passage of said products of combustion at a temperature of the order of 5000° F. and higher with conversion of said metal to a carbide phase at and adjacent the internal surface of the nozzle with concurrent production of tungsten metal and substantial increase in melting point of the thus-converted composition, and said conversion occurring to a progressively decreasing extent outwardly of the nozzle body from said surface.

7. A nozzle according to claim 6, said constituent being at least one member of the group consisting of $W_2C$, WC, and mixtures of W and a tungsten carbide.

8. A nozzle according to claim 7, said constituent being W with about 1.4 percent of $W_2C$.

9. In the operation of a rocket motor or the like propulsion unit in which high energy fuel is burned with production of high velocity products of combustion at a temperature of the order of 5000° F., the improvement consisting in passing said combustion products through a nozzle at least the internal surface of which is a bonded composition of an intimate mixture of (1) a finely divided carburized tungsten constituent, and (2) at least one finely divided metal of the group consisting of tantalum and niobium, said tungsten constituent and said metal interacting upon passage of said products of combustion at a temperature of the order of 5000° F. and higher with conversion of said metal to a phase of its carbide with concurrent production of tungsten metal and substantial increase in melting point of the thus converted composition.

10. In the operation of a rocket motor or the like propulsion unit according to claim 9, said composition being, by weight, (1) a major proportion of a finely divided carburized tungsten constituent, and (2) a minor proportion of at least one finely divided metal of the group consisting of tantalum and niobium.

11. In the operation of a rocket motor or the like propulsion unit in which high energy fuel is burned with production of high velocity products of combustion at a temperature of the order of 5000° F., the improvement consisting in passing said combustion products through a nozzle composed of a bonded composition of an intimate mixture of (1) a finely divided carburized tungsten constituent, and (2) at least one finely divided metal of the group consisting of tantalum and niobium, said metal being provided in an amount sufficient to convert all the carbon of said constituent to a phase of the metal carbide, said tungsten constituent and said metal interacting upon passage of said products of combustion at a temperature of the order of 5000° F. and higher with conversion of said metal adjacent the internal surface of the nozzle to a carbide with concurrent production of tungsten metal and substantial increase in melting point of the thus-converted composition, and said converison occurring to a progressively decreasing extent outwardly of the nozzle body from said surface.

12. A nozzle according to claim 1, said composition being infiltrated with silver as bonding agent.

13. A nozzle according to claim 6, said composition being infiltrated with silver as bonding agent.

14. A nozzle according to claim 11, said composition being infiltrated with silver as bonding agent.

15. A nozzle according to claim 1, said composition also including carbide of the group tantalum and niobium.

16. A nozzle according to claim 5, said composition also including carbide of the group tantalum and niobium carbides.

References Cited by the Examiner
UNITED STATES PATENTS

| | | | |
|---|---|---|---|
| 1,848,899 | 3/1932 | McKenna | 29—182.8 |
| 1,892,653 | 12/1932 | McKenna | 75—204 |
| 1,893,078 | 1/1933 | Genuit | 29—182.7 |
| 2,011,369 | 8/1935 | McKenna | 29—182.8 |
| 2,123,576 | 7/1938 | McKenna | 29—182.7 |
| 2,313,070 | 3/1943 | Hensel et al. | 29—182.8 |
| 2,751,188 | 6/1956 | Rath | 60—39.69 |

FOREIGN PATENTS

| | | |
|---|---|---|
| 452,503 | 8/1936 | Great Britain. |
| 691,953 | 5/1953 | Great Britain. |

OTHER REFERENCES

"Rocket Refractories," publication, NAVORD Report 4893, NOTS 1191, August 26, 1955 (page 15).

MARK NEWMAN, *Primary Examiner*.

SAMUEL LEVINE, *Examiner*.